United States Patent
Liao et al.

(10) Patent No.: US 7,096,288 B2
(45) Date of Patent: Aug. 22, 2006

(54) ARCHITECTURE OF RECONFIGURABLE RADIO PROCESSOR

(75) Inventors: I-Tao Liao, Taipei (TW); Tse-Hao Lee, Sindian (TW); Chung-Chieh Kang, Tainan (TW); Chia-Hung Shih, Tainan (TW); Chih-Wei Liu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 228 days.

(21) Appl. No.: 10/850,760

(22) Filed: May 21, 2004

(65) Prior Publication Data

US 2005/0125578 A1 Jun. 9, 2005

(30) Foreign Application Priority Data

Dec. 3, 2003 (TW) .............................. 92134094 A

(51) Int. Cl.
*H04B 1/38* (2006.01)
*G06F 13/00* (2006.01)
*G06F 12/00* (2006.01)

(52) U.S. Cl. ...................... 710/104; 710/240; 710/100; 455/90.2

(58) Field of Classification Search ...................... None
See application file for complete search history.

(56) References Cited

U.S. PATENT DOCUMENTS 5,790,817 A 8/1998 Asghar et al. .............. 395/309

2006/0035603 A1* 2/2006 Al-Adnani ................. 455/90.2

FOREIGN PATENT DOCUMENTS

WO WO 00/69084 11/2000

OTHER PUBLICATIONS

"A Re-Configurable Architecture—Radio Processor" found in 2003 International Symposium on VLSI Technology, Systems and Applications. Proceedings of Technical Papers. (IEEE Cat. No. 03TH8672) ,p. 200-3, Hsinchu, Taiwan, Oct. 6-8, 2003. Authors: I-Tao-Liao, Tse-Hao-Lee, Chung-Chieh-Kang, Chia-Hung-Shih, Jia-Cheng-Tsai, Hung-Chi-Lai, Jian-Hui-Shen, Chi.*

* cited by examiner

*Primary Examiner*—Rehana Perveen
*Assistant Examiner*—Brian Misiura

(57) ABSTRACT

A reconfigurable radio processor comprises a task interface and an execution kernel. The processor can be applied to a platform comprising a main processor and on-chip bus, and uses a task-based interface between the main processor and the radio processor. The radio processor simplifies the designs for control system, instruction set and data path. The bus interface includes a task dispatcher. The execution kernel comprises a global control unit, at least one function unit, an operation network, and a data network. The radio processor meets the reconfigurable and scalable requirements. It allows system designers to realize many applications on an IC chip, as well as increases the add-on values for the product. It provides system designers with the possibility of replacing another main processor under a special consideration.

15 Claims, 9 Drawing Sheets

ARCHITECTURE OF RECONFIGURABLE
RADIO PROCESSOR

FIELD OF THE INVENTION

The present invention generally relates to reconfigurable digital wireless communication devices, and more particularly to a reconfigurable radio processor.

BACKGROUND OF THE INVENTION

In conventional communication systems, a microprocessor is usually applied for dealing with software program control and part of the DSP algorithm with less computation requirement, and an associated hardware accelerator is responsible for the complex DSP algorithm. The implementation for the hardware accelerator is usually accomplished with an application-specific integrated circuit (ASIC). While, because of the rapid development of wireless communication technology and the becoming shorter and shorter cyclic lifetime of the relative products in market, there is an appeal already urging for an advanced reconfigurable and programmable hardware accelerator.

However, such a solution doesn't really relieve the high CPU dependence on a portable multi-function device. The CPU time is usually used to execute a single task. And it's absolutely impractical and uneconomical for a system designer to change the CPU with the price or performance consideration.

FIG. 1 is a block diagram illustrating a conventional reconfigurable radio communication device. As shown in FIG. 1, the conventional reconfigurable radio communication device is mainly comprised of a programmable processor 101, a heterogeneous reconfigurable multi-processor 103, and a system bus 107 connecting the processor 101 with the multi-processor 103. In the radio communication device, the reconfigurable multi-processor 103, which is composed of a plurality of co-processors to serve for an accelerator in the system, is generally accomplished with ASICs and programmable logic devices. A framework like this is defective in that the routing area of the programmable logic device is extraordinary large and the power consumed is considerable. Another disadvantage of this communication framework is that the CPU needs to arrange all the tasks in the system between the components in the communication device.

Another communication framework of reconfigurable multi-processor was disclosed in U.S. Pat. No. 5,790,817. As shown in FIG. 2, this communication framework uses a micro-scheduler 201 to arrange the working schedule between digital signal processors (DSPs) 203 and 205 to thereby decrease the dependence degree upon CPU. However, using the DSP to deal with the digital signal processing for the bit stream data is not an optimized solution.

To improve both efficiency and power consumption on portable multi-function devices, this invention is intended to provide a new communication framework for a radio processor. In a platform, a user may entail most part of communication tasks to be processed on the radio processor so that the dependence degree on CPU could be decreased. Besides, the radio processor has optimized the conditions of the communication system and relative hardware based on the premise capable of realizing different standards.

SUMMARY OF THE INVENTION

The primary object of this invention is to provide a reconfigurable architecture radio processor, by which the functions to be performed are packaged in task formats stored in the system memory of this radio processor. The radio processor is informed by a microprocessor of an address in memory which points to a task so that it will perform the task accordingly as expected.

The architecture of reconfigurable radio processor is mainly comprised of a bus interface and an execution kernel. The bus interface has a task dispatcher which decodes the task from the platform and dispatches the task format into command field and data field. The execution kernel is comprised of a global control unit (GCU), at least a function unit (FU), an operation network, and a data network. The global control unit decodes and executes basic operations that have to be done by the radio processor of different versions and transmits the local operation to a corresponding function unit via the operation network. Every function unit executes the local operation and processes the data thereof in the corresponding task, then transfers the processed data to a next function unit for further processing via the data network. The data network and function unit will have different configuration in different tasks. The data processing procedure in the function units will be driven by data, and the data driven architecture will decrease the workload of global control unit.

Every function unit further comprises an interface control unit (ICU), a local control unit (LCU), and a FU data path. Each interface control unit is identically designed to control the transmission and operation interface between the function units and the global control unit. The local control unit is provided to execute the local operation received from the global control unit and covert the data received from the data network into a data format of the FU data path. The FU data path is the kernel of function unit for processing data.

In order to satisfy the configurable and scalable conditions and reduce the dependence on master processors, the control system, instruction set, and data path are carefully designed. All functions are packaged into tasks and taken as the software and hardware interfaces, in which most part of the tasks are fully distributed and executed by respective function unit. A task format includes command and data fields. The information in command field is described by using task command language (TCL), and the control and data signal flows are split. This architecture can keep data smoothly and correctly flowing in the data path.

The foregoing and other objects, features, aspects and advantages of the present invention will become better understood from a careful reading of the detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
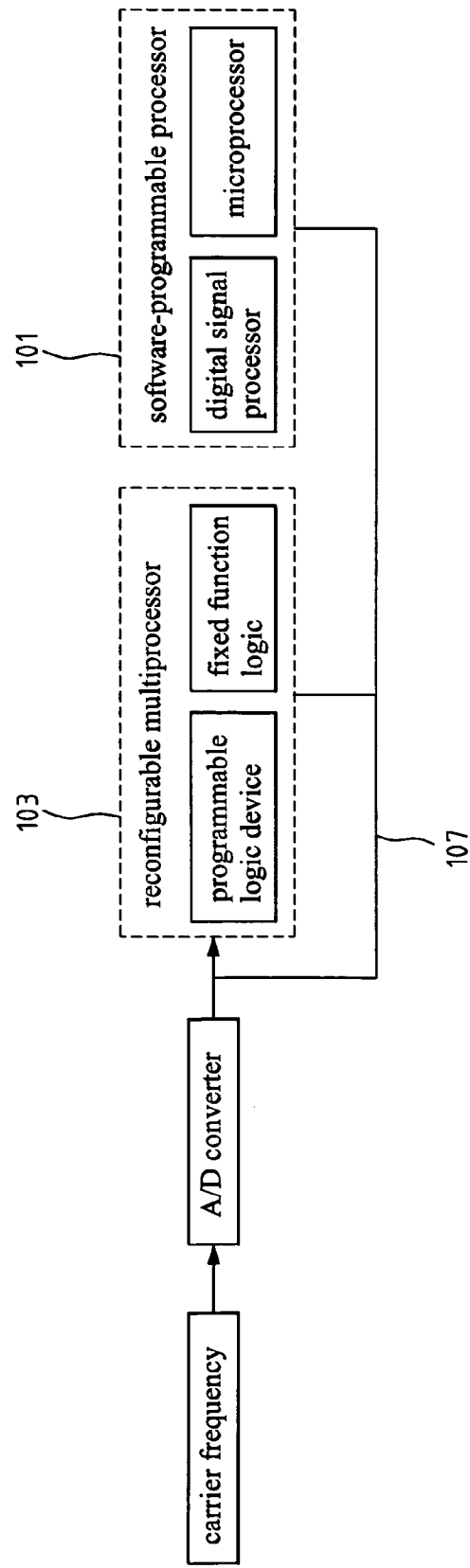
FIG. 1 is a block diagram illustrating a conventional reconfigurable multi-processor.
Figure 2:
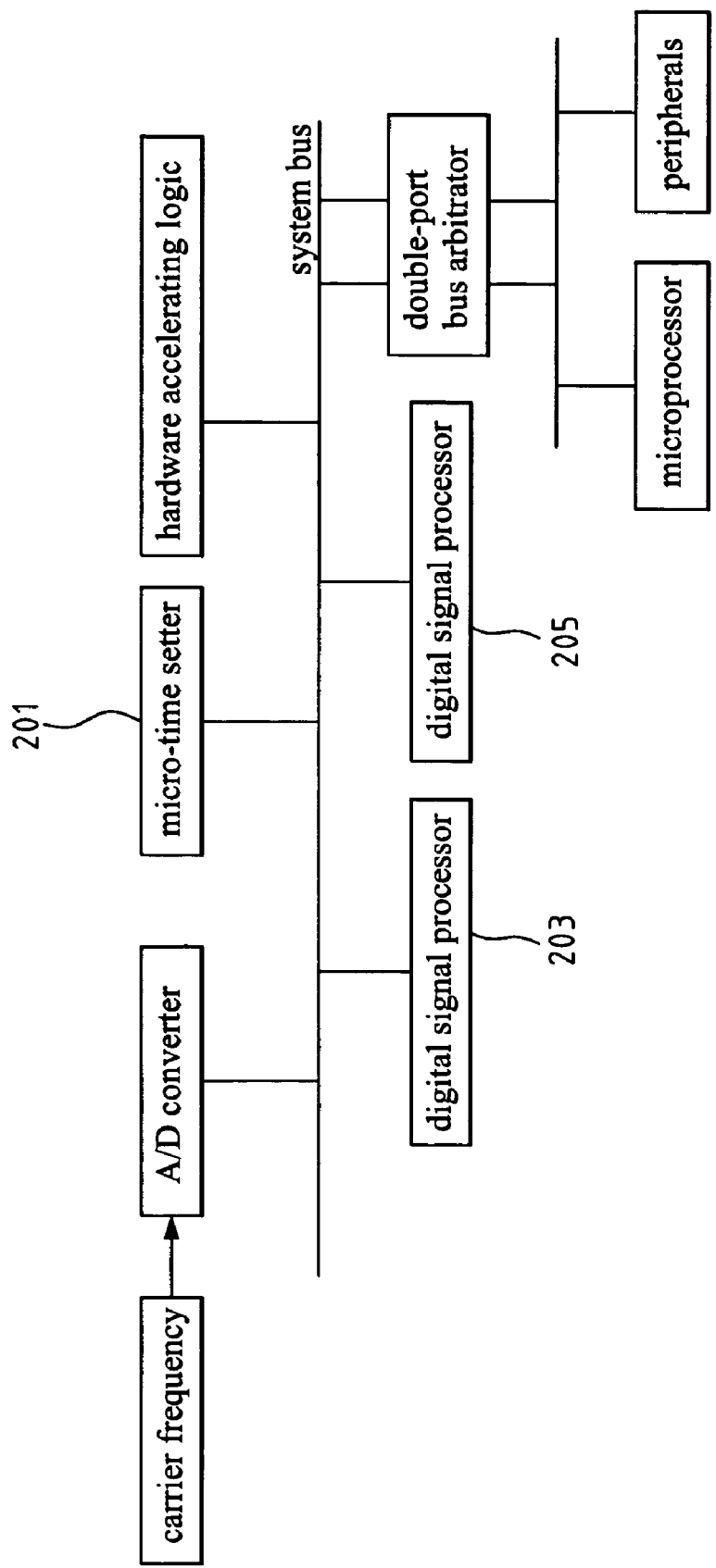
FIG. 2 is a block diagram illustrating another conventional reconfigurable multi-processor.
Figure 3:
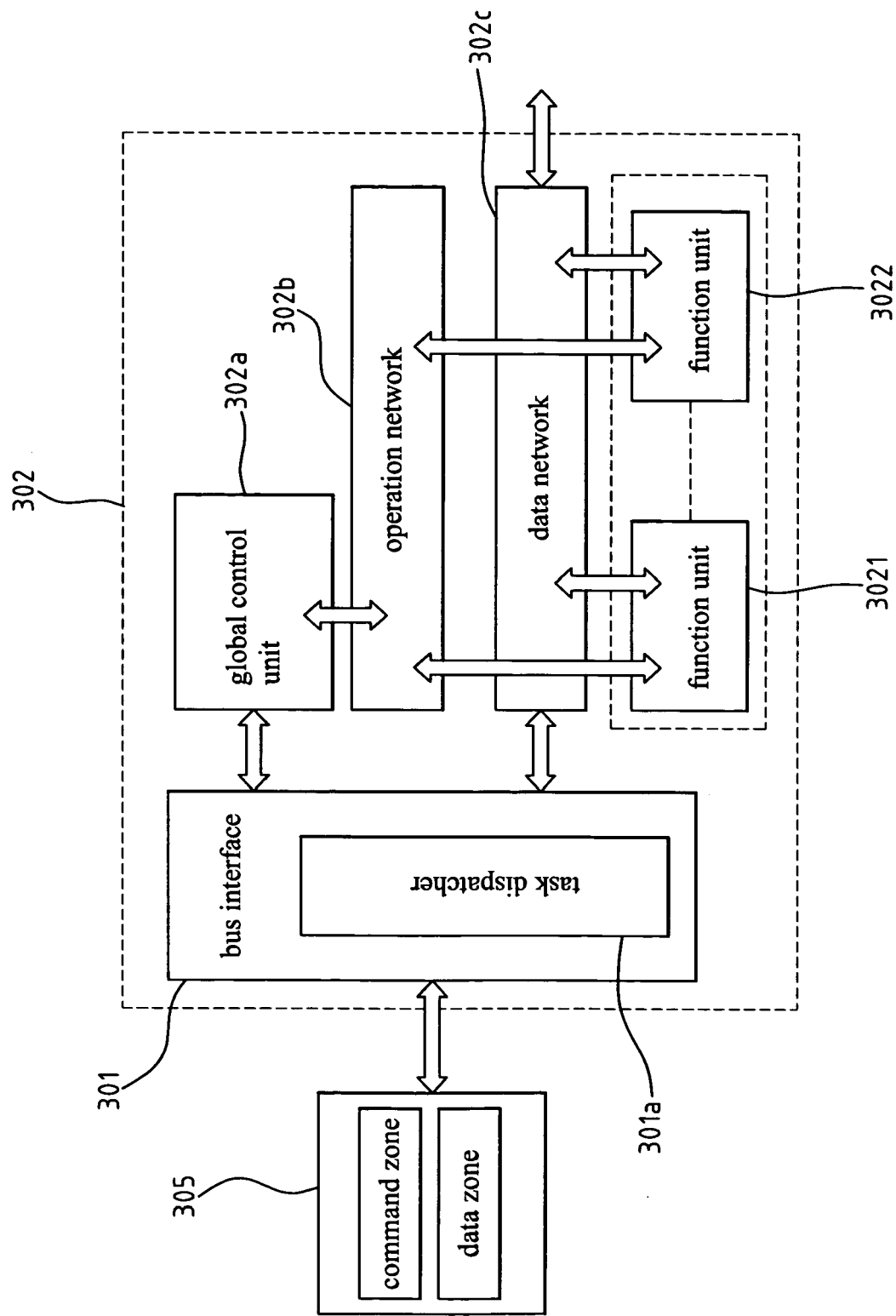
FIG. 3 is a schematic view showing the architecture of a radio processor according to the invention.

In order to furnish different functions among different control systems for meeting scalable infrastructure requirement, the architecture of the radio processor according to the invention is as shown in FIG. 3. Referring to FIG. 3, the radio processor comprises a bus interface 301 and an execution kernel 302. The task dispatcher 301*a* is in the bus interface 301 for decoding tasks 305 from platform (including a main processor and on-chip bus). The format of a task is configured into a command field and a data field. The data field stores the data supplied and processed for building such a configuration. The execution kernel 302 comprises a global control unit 302*a*, at least one function unit, an operation network 302*b*, and a data network 302*c*. In the preferred embodiment of the invention, there are two function units 3021 and 3022 available.

The global control unit 302*a* is in charge of decoding and executing some basic operations required for the radio processors in different versions. One type of the basic operations will transfer a local operation to a corresponding function unit 3021 and 3022 via the operation network 302*b*. Every function unit executes and processes a local operation and data of a corresponding task, then transfers the processed data to a next function unit for further processing via the data network 302*c*. Herein, data networks and function units for different applications may be organized into different configurations, and by the data driven architecture, it is possible to cut down the task volume of the global control unit. After processing and completing a task 305, the radio processor reports accomplished results to the platform.

Figure 4A:
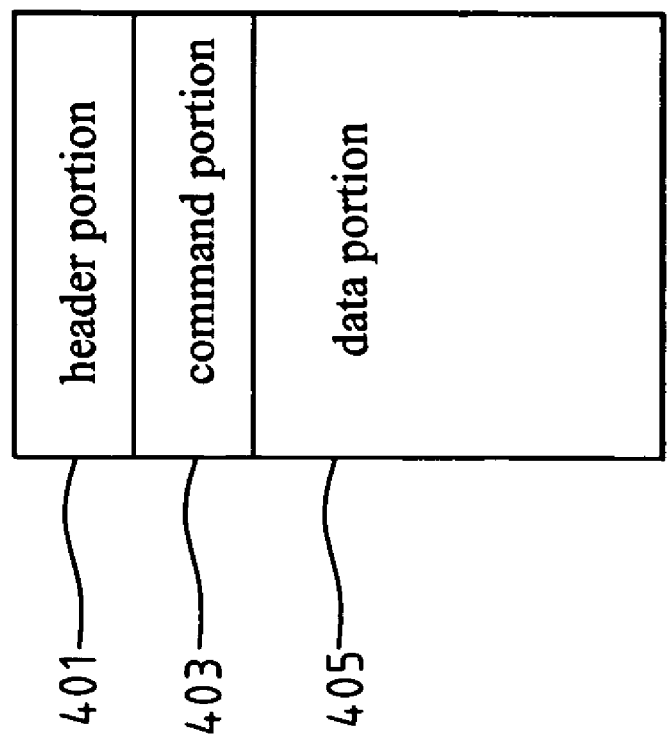
FIG. 4(a) shows the frame format of a task according to the invention.
Figure 4B:
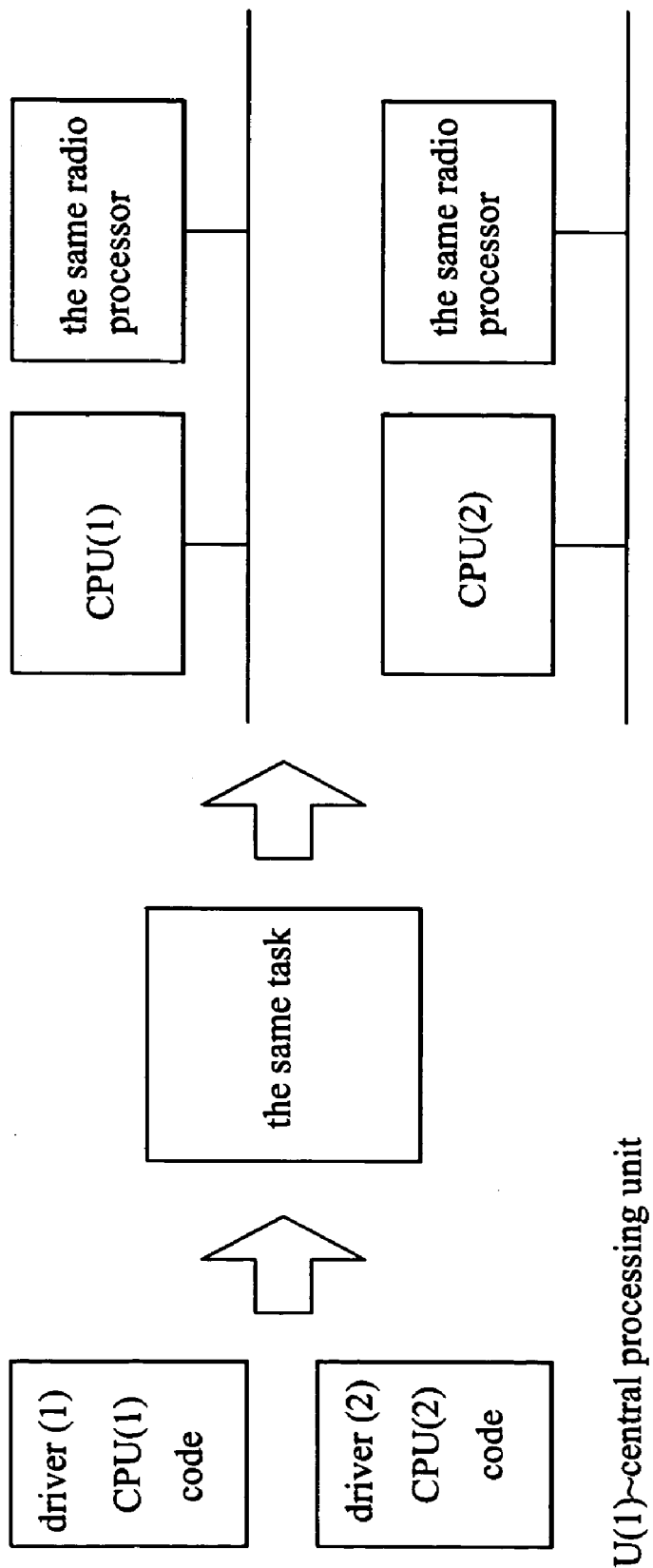
FIG. 4(b) shows the radio processor of the invention is workable with different CPUs.

The radio processor with different versions is accompanied by different function demands that would require different instructions to describe the applications executed in the radio processor. An instruction for an instruction set usually comprises an operator and a corresponding operand. The drawback is that an operator corresponds to a set of operands, and this doesn't meet the requirement of a reconfigurable and scalable optimum structure. As mentioned above, this invention packs all the system functions into tasks and takes task as the interface of software and hardware. The instruction set according to the invention combines the applications from the platform, and the frame format of a task is configured into a command field as well as a data field. Referring to FIG. 4(*a*), there are three fields in a task format: header 401, command 403, and data 405. The header field describes the outlook of a task. The command field characterizes an application from the platform and describes the configuration for the task. It contains the operator needed for processing data, in which a task command language (TCL) is employed to describe the operator, including local operation instructions and global operation instructions to be executed. The data field is just the raw data in the task configuration and the raw data will be processed by the radio processor.

It is therefore understood that a task is taken in this invention as an interface between the microprocessor and the radio processor. The main processor would provide a memory address for locating where the task is stored. With the task interface, the system designer may change the microprocessor according to the demand of products with the efficiency and cost consideration. FIG. 4(*b*) shows that the radio processor of this invention is workable with different CPUs. In FIG. 4(*b*), both CPU(1) and CPU(2) have the same task although they are different in executable code. Therefore, a system designer may change the microprocessor but keep the radio processor unchanged to achieve high performance and low system cost.

Figure 5A:
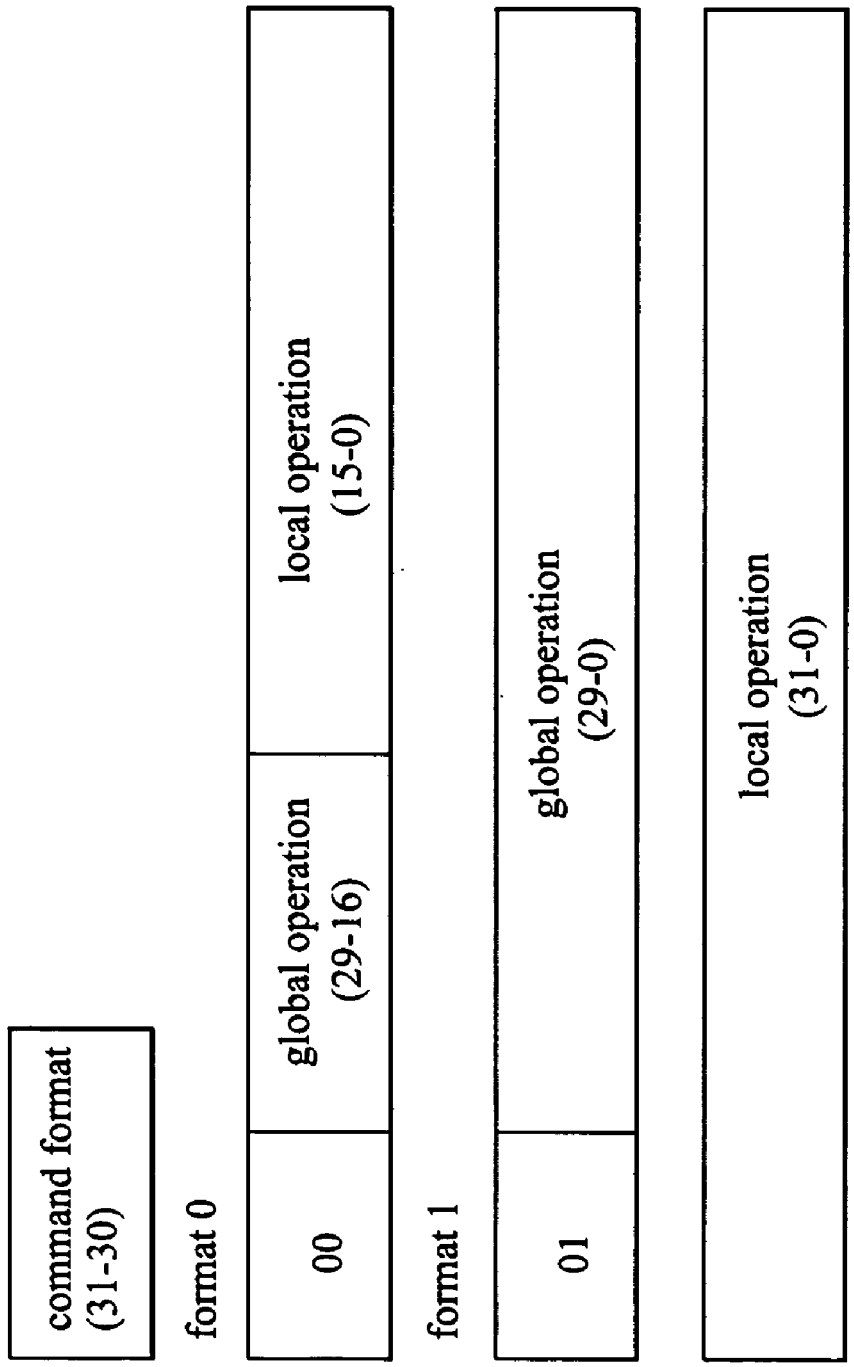
FIG. 5(a) shows the task command language format with format 0 and format 1 according to the invention.
Figure 5B:
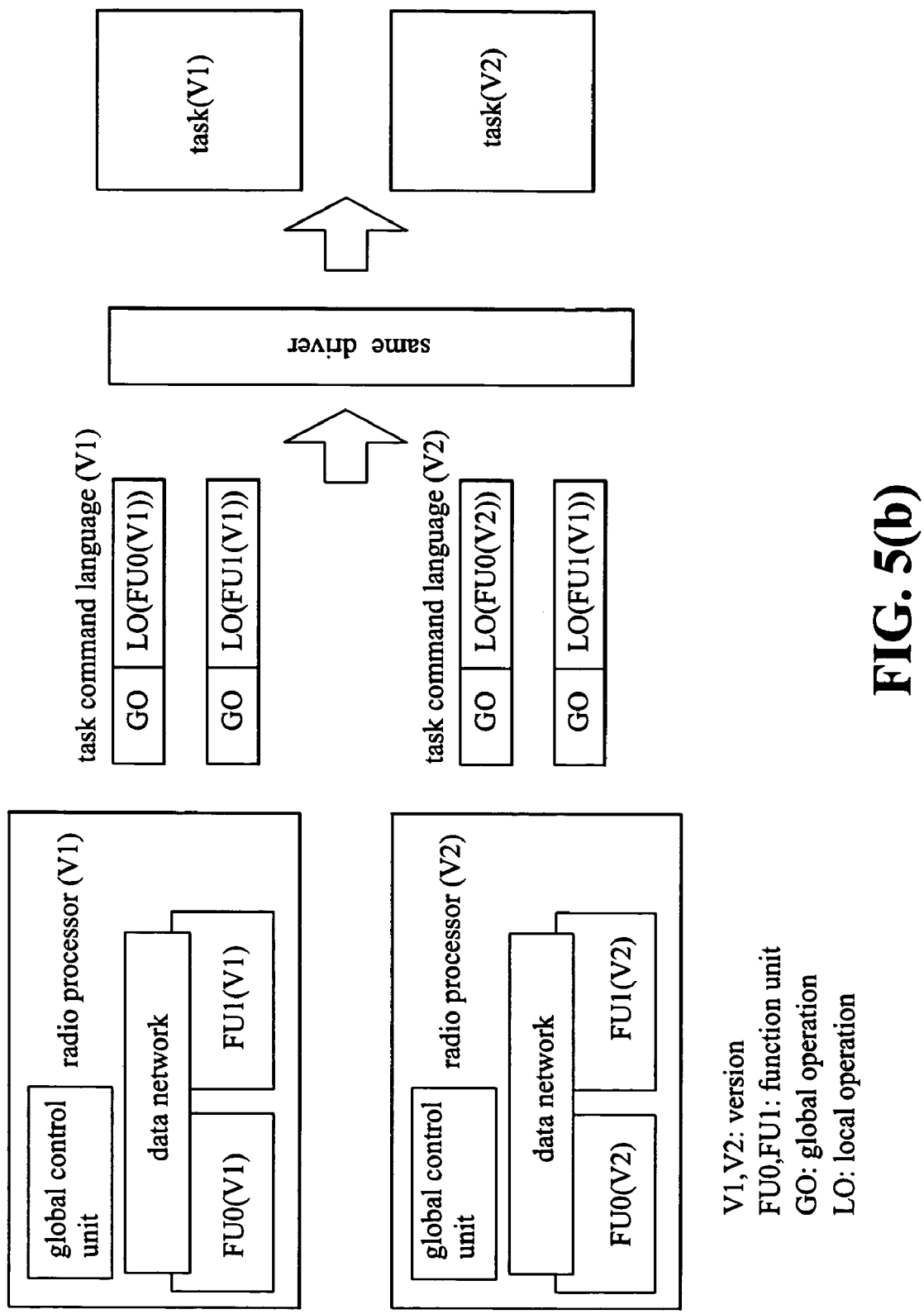
FIG. 5(b) shows the format for task command language of the invention is fitful with different versions of radio processor in response to different demands of functions.

According to the invention, the command field may have several types of format and different lengths. In an embodiment of this invention, two bits are taken for expressing the type of the command format. Hence, four types in format 0~3 are available. FIG. 5(*a*) shows two types in format 0~1 of the task command language. In format 0, 32 bits are provided, in which bits 0~15, bits 16~29, and the rest bits 30~31 specify the local operation, the global operation, and the command format, respectively. Such format is particularly fitful with a function unit coping with a real-time configuration with limited data. Format 1 is composed of at least two 32-bit data sets, in which bits 0~29 of the first 32-bit data set specify the global operation, and bits 30~31 specify the command format. And the bits after the first data set specify the local operation. Such format is particularly fitful with a function unit coping with a configuration with a large quantity of configuration data.

FIG. 5(*b*) shows that the format for task command language of the invention is fitful with different versions of radio processor in response to different demands of functions. In FIG. 5(*b*), two radio processors in different versions v1 and v2 have the same control path and data path although different functions (FU0, FU1) are demanded. Or, two radio processors with the same task format, use different task command languages (same global operation (GO), different local operations LO(FU0(), FU1()). Accordingly, different tasks can be generated with an identical driver.

In the following sections, each element within the execution kernel 302 is described in more detail.

In order to maintain a smooth data flow and keep the accuracy of the data in a data path, a conventional global controller is usually used and required to record the configuration time of every function unit in a system. The configuration time means the time required to configure a function unit into a corresponding data-processing mode correctly. The global controller is responsible for controlling the data flow and allowing it to go farther after the configuration thereof in a function unit is completed correctly. The defect herein is that the global controller is not a universal controller and has to be revised whenever a different function unit is encountered. In addition, a bottleneck is prone to be formed in the system when the configuration time of a function unit is particularly long. Therefore, in view of the above, a control flow and a data flow are split at the beginning in this invention. The most part of control task is dispatched to respective function units in the architecture of control unit of the invention. Moreover, a way of data driven architecture is adopted. Every function unit has to determine if it would process data and allow the data to flow into its data path for processing. Whether the processed data is allowed or not to flow into a next function unit for processing is determined by the next-stage function unit. Therefore, in the case new function unit is needed for accelerating new data operations, all a designer has to do is to replace the function unit without revising the global controller.

Figure 6:
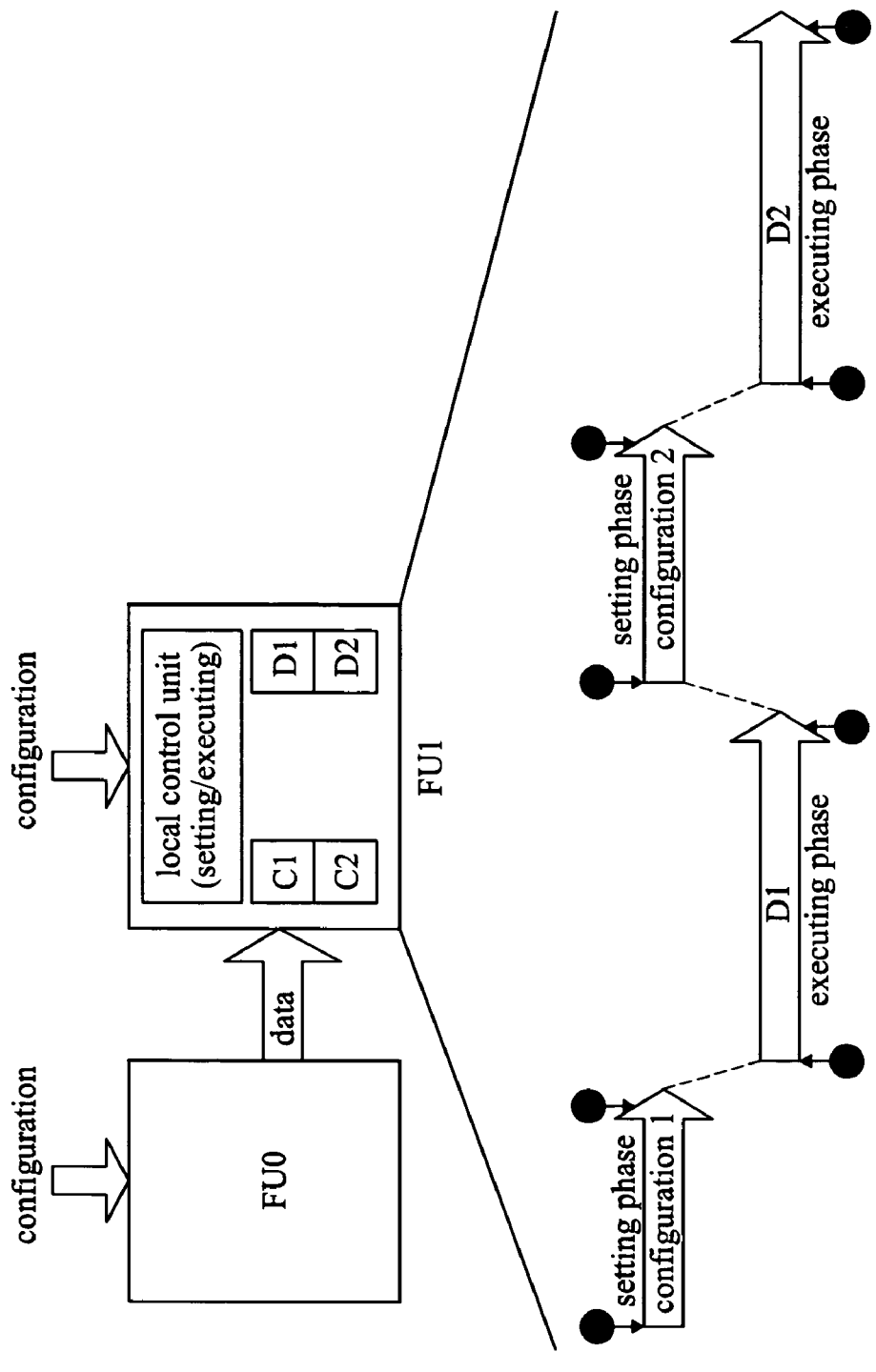
FIG. 6 shows a data path structure of two-stage self-control according to the invention.

With this architecture of a distributed control unit, the data-path architecture of this invention has a two-phase self-control including a setting phase and an executing phase, and uses a data-driven architecture to simplify the system design. FIG. 6 illustrates the two phases for the data-path architecture according to the invention. In FIG. 6, the data of function unit FU0 flows into the next function unit FU1 for processing. The function unit FU1 would execute a command of control flow only during the setting phase, and process data of data flow only during the executing phase. During the setting phase, only the configuration data will be processed, and after the function units execute the local operations of the function units in the task, each function unit then enters the execution phase for processing data. Accordingly, during a setting phase (start) of configuration 1, the function unit FU1 would execute a command C1 of a control flow only. And then, the function unit FU1 would process data D1 during an executing phase following the end of the configuration 1. Again, during a setting phrase (start) of configuration 2, the function unit FU1 would execute a command C2 of a control flow only. And then, the function unit FU1 would process data D2 during an executing phase following the end of the configuration 2.

Figure 7:
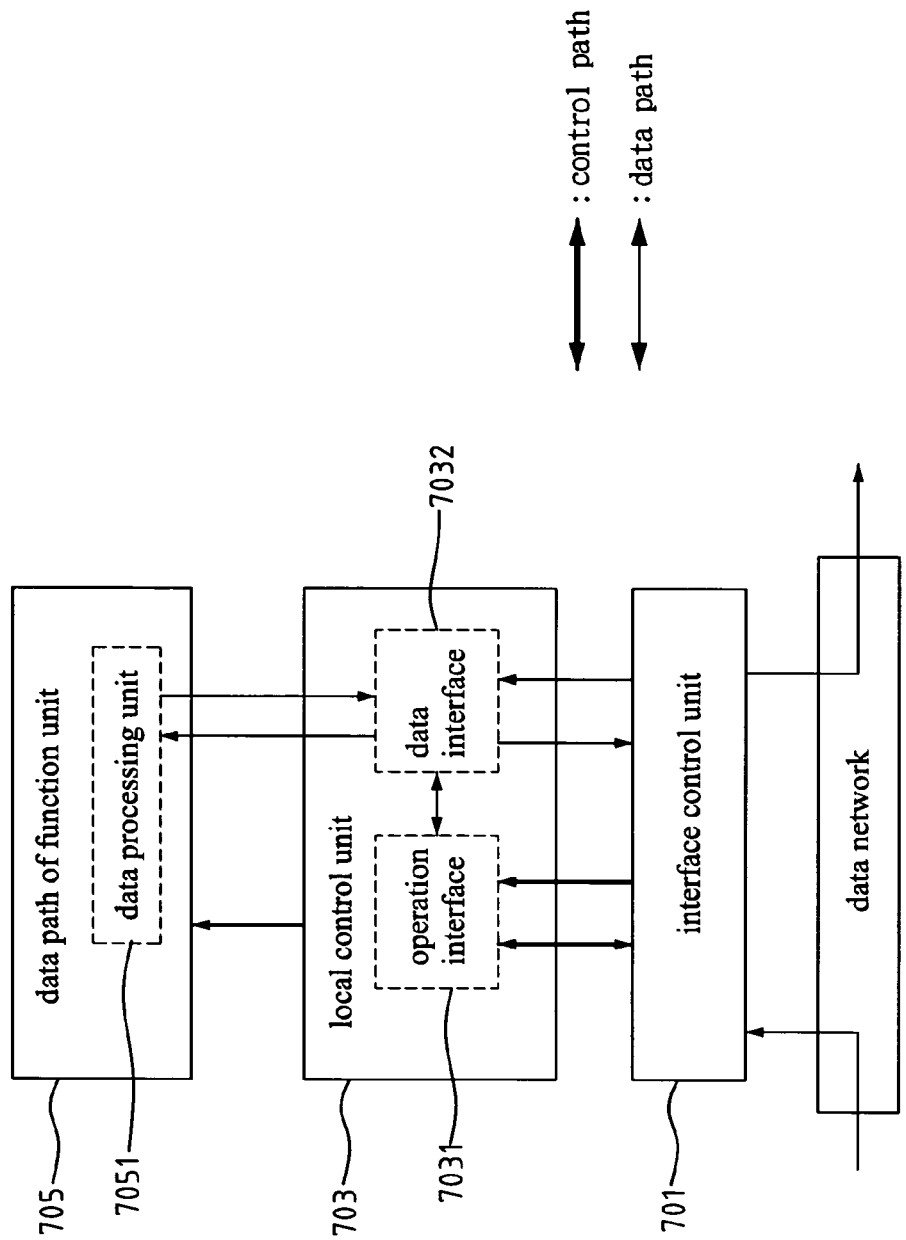
FIG. 7 shows a block diagram of a function unit according to the invention.

Next, the internal structure of a function unit will be described below with reference to FIG. 7. As illustrated in FIG. 7, a function unit is comprised of an interface control unit 701, a local control unit 703, and a data path of function unit 705. The interface control unit 701 of each function unit is designed identically. It controls the transmission interface between the function unit and the global control unit 302a, and controls the data transmission interface among function units. The identical interface control units provided would ensure a correct operation of each function unit in a radio processor. The local control unit 703 is guided to execute the local operation received from the global control unit 302a and convert the data received from a data network into a data format fit for the data path of function unit 705. The data path of function unit 705 is the data-processing kernel, and different algorithms correspond to different data paths of function unit as well as different designs of local control unit.

As mentioned above, every function unit has two phases of self-control, setting phase and execution phase, in the local control unit 703. The local control unit 703 comprises an operation interface 7031 and a data interface 7032. Only the operation interface 7031 of the local control unit 703 works during the setting phase. After the end of setting phase, the local control unit will transfer the control from operation interface 7031 to the data interface 7032. During the execution phase, the data interface 7032 converts the data received from a data network into a data format required by data processing element 7051 in the data path of function unit 705. The data processed by the data processing element 7051 is converted with the width of data network, and it is then sent out via the data network.

In summary, the architecture of radio processor according to the present invention is a novel and delicate design specialized in control system, instruction set, and data path. It meets the configurable and scalable requirements. With the radio processor, the minimum system cost design, multiple applications in a single chip, and addition of value-added can be expected. It also provides system designers with the possibility of replacing another main processor under a special consideration.

Although the present invention has been described with reference to the preferred embodiments, it should be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An architecture of reconfigurable radio processor applied to a platform having a main processor and on-chip bus, said architecture of reconfigurable radio processor comprising:
    a bus interface having a task dispatcher describing an application task from the platform, said bus interface configuring a task into a command zone and a data zone to be processed for forming a configuration; and
    an execution kernel including a global control unit, at least a function unit, a control network and a data network, each function unit having a local control unit for executing a local operation received from said global control unit, said local control unit having an operation interface and a data interface, wherein said operation interface works during a setting phase of said function unit and transfers control to said data interface after having completed the local operation and entering an execution phase of said function unit;
    wherein said global control unit decodes and executes basic operations that have to be done by said radio processor of different versions and transfers the local operation to a corresponding function unit via said control network, every function unit executes the local operation and processes data thereof in a corresponding task, and then, transfers the processed data to a next function unit for further processing via said data network.

2. The architecture of reconfigurable radio processor according to claim 1, wherein an instruction set is adopted for combining applications from the platform and a task is configured into a command section and a data section.

3. The architecture of reconfigurable radio processor according to claim 2, wherein the content of a task includes three fields:
    a header field describing outlook of said task;
    a command field using a task command language to describe operators required for processing data, said operators including local operation instructions and global operation instructions to be executed; and
    a data field describing raw data in a task configuration, and said raw data being required to be served by said radio processor.

4. The architecture of reconfigurable radio processor according to claim 1, wherein said radio processor adopts a distributed control unit to entrust local operations of a task to said function unit, every function unit determines if it would process data and allow the data to flow into its data path for processing, and whether the processed data is allowed or not to flow into a next function unit for processing is determined by a next-stage function unit.

5. The architecture of reconfigurable radio processor according to claim 4, wherein said distributed control unit adopts a data-driven architecture to permit every function unit to determine if it allows data to flow into its data path for processing.

6. The architecture of reconfigurable radio processor according to claim 5, wherein said radio processor adopts a data-path architecture with two-phase self-control.

7. The architecture of reconfigurable radio processor according to claim 6, wherein all function units are split into a setting phase and an execution phase under the data-path architecture of two-phase self-control, each function unit executes the commands of control flow only during the setting phase while processes the data of data flow only during the execution phase, after a configuration has been completed, only the data following the completed configuration is processed, and after the local operation of a function unit in a task has been performed, the function unit enters the execution phase for processing data.

8. The architecture of reconfigurable radio processor according to claim 1, wherein each function unit further comprises:
   an interface control unit for controlling transmission interface between said function unit and said global control unit, and controlling data transmission interface among function units; and
   a data path of function unit for data processing;
   wherein the local control unit converts the data received from said data network into a data format fit for said data path of function unit.

9. The architecture of reconfigurable radio processor according to claim 8, wherein all the interface control units are identically designed to ensure a correct operation of every function unit in said radio processor.

10. The architecture of reconfigurable radio processor according to claim 8, wherein said data path of function unit further comprises a data processing element, and during the executing phase, said data interface converts the data received from said data network into a data format required by said data processing element in the data path of function unit, the data processed by said data processing element is converted with the width of said data network, then sent out via said data network.

11. The architecture of reconfigurable radio processor according to claim 3, wherein said command field has at least two kinds of format.

12. The architecture of reconfigurable radio processor according to claim 1, wherein said bus interface takes a task as an interface between the main processor and the radio processor, and locates a block storing a format of said task according to a memory address provided by the main processor, and said execution kernel decodes the format of said task, executes operation and processes data described in the format of said task, and reports accomplished results to the platform.

13. The architecture of reconfigurable radio processor according to claim 12, wherein the format of said task comprises a configuration needed by said radio processor for said task, and data for the radio processor to deal with for said configuration.

14. The architecture of reconfigurable radio processor according to claim 12, wherein the content of a task includes three fields:
   a header field describing outlook of said task;
   a command field using a task command language to describe operators required for processing data, said operators including local operation instructions and global operation instructions to be executed; and
   a data field describing raw data in a task configuration, and said raw data being required to be served by said radio processor.

15. The architecture of reconfigurable radio processor according to claim 12, wherein said radio processor adopts a distributed control unit to entrust local operations of a task to said function unit, every function unit determines if it would process data and allow the data to flow into its data path for processing, and whether the processed data is allowed or not to flow into a next function unit for processing is determined by a next-stage function unit.

* * * * *